March 22, 1955  F. N. REYNOLDS  2,704,481
EXPANSIBLE MANDREL
Filed Nov. 24, 1951
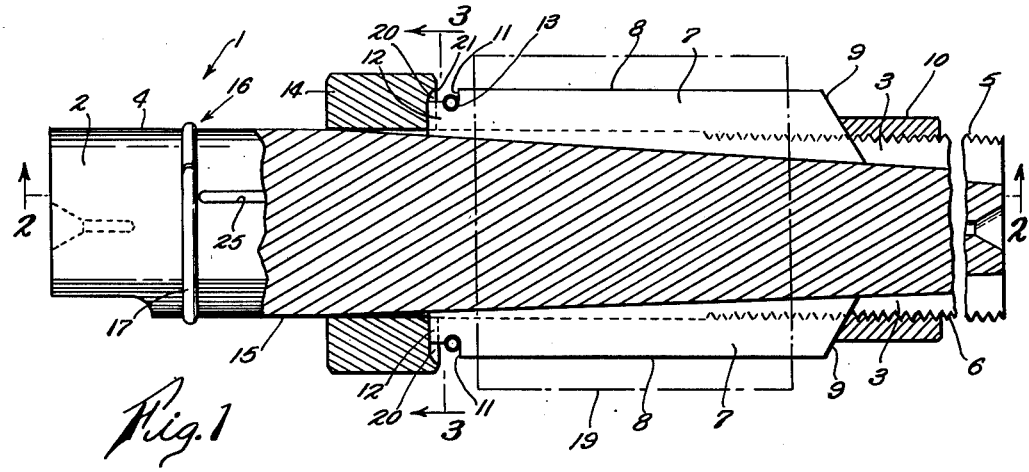
Fig. 1
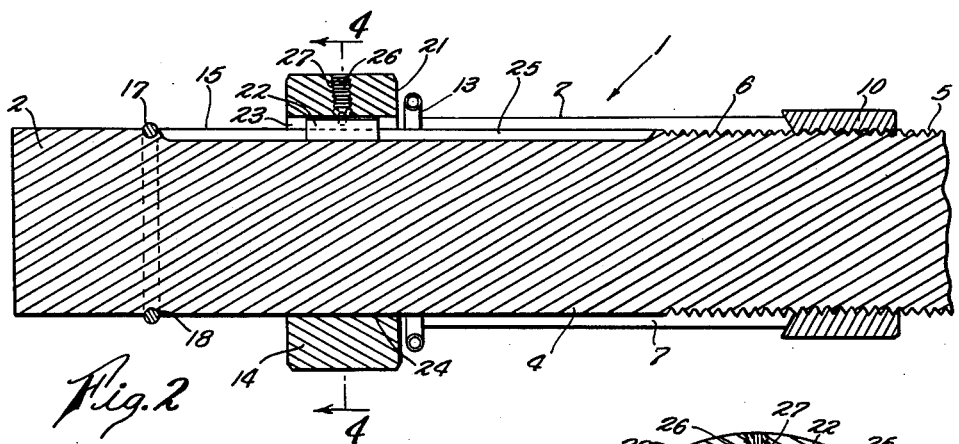
Fig. 2
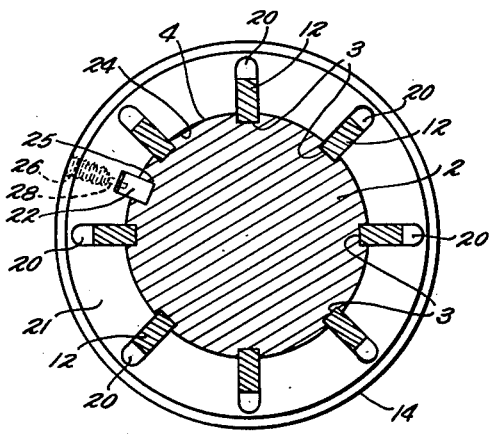
Fig. 3
Fig. 4
INVENTOR.
Frederick N. Reynolds
BY
Murray, Sackhoff & Murray
ATT'YS

United States Patent Office 2,704,481
Patented Mar. 22, 1955

2,704,481

EXPANSIBLE MANDREL

Frederick N. Reynolds, Augusta, Ky.

Application November 24, 1951, Serial No. 257,995

3 Claims. (Cl. 82—44)

This invention relates to expansible mandrels and embodies, more specifically, a combined adjustable end support and bumper sleeve for the work engaging bars of a mandrel having substantially the features of the mandrel disclosed in my United States Letters Patent No. 2,526,772.

The mandrel disclosed in my said patent has a circular row of longitudinally slidable work bars disposed in inclined guide ways formed in the periphery of the arbor. The common ends of these work bars, opposed to the work bar traversing nut, are secured on the arbor by a spring means which merely presses said bar ends into their respective guide ways. When the mandrel is used to support work having relatively large diameter bores, longitudinal adjustment of the work bars by the nut to accommodate the mandrel to said large diameters, moves the bars to positions on the arbor which radially project all or a major portion of the said bar ends beyond the guide ways thus leaving the bar ends without the means of lateral support afforded the bars by the deeper sides of the guide ways. These unsupported work bar ends are therefore subject to great lateral stresses in use, which, in time, cause fractures in the bars that result in their ultimate breakage.

It is therefore an object of the invention to provide an arbor having a novel and simplified means for supporting the common ends of the work bars, particularly work having relatively large diameter bores are mounted on the arbor, said support also serving as a bumper sleeve for longitudinally displacing the bars to retract them and release the work from the arbor.

Another object of the invention is to provide an expanding mandrel of the character described that may be adjusted to mount work pieces which have relatively large internal diameters without danger of breaking or impairing the usefulness of the expanding, work engaging bars therefor.

Objects relating to details and economies of my invention will appear from the following description and from the preferred embodiment of my invention as illustrated in the accompanying drawing, in which:

Fig. 1 is a fragmental section taken longitudinally through my expanding mandrel.

Fig. 2 is a cross section taken on line 2—2 of Fig. 1.

Fig. 3 is an enlarged section taken on line 3—3 of Fig. 1.

Fig. 4 is an enlarged section taken on line 4—4 of Fig. 2.

Referring to the drawings the numeral 1 indicates an expanding mandrel having a cylindrical arbor 2 formed with a plurality of inclined, longitudinal guide ways 3 radially spaced about the periphery 4 of the arbor. The guide ways are relatively narrow channels milled in the arbor and converge inwardly toward the axis of the arbor in the direction of its forward end 5, said forwad end being externally threaded at 6 throughout a substantial part of its longitudinal extent.

Work aligning bars 7 are positioned for longitudinal sliding movement in the guide ways 3, the inner faces of the bars being inclined at an angle corresponding to the inclination of the bottom walls of the guide ways 3 so that the outer faces 8 of the bars are maintained in parallel relationship with respect to the axial center of the arbor, throughout their longitudinal movements along the arbor. The forward ends of the bars are tapered at 9 to engage a bar traversing nut 10 threaded to the forward end of the arbor. The rear portions of the bars are notched at 11 to form radially reduced ends 12 around which a circular spring 13 extends to press and hold the common rear ends of the bars in the guide ways 3.

A bumper sleeve 14 is slidable longitudinally on the rear end 15 of the arbor from a position contacting the rear ends 12 of the bars to a fixed stop 16 on the arbor. The stop takes the form of a split ring 17 that snaps into a peripheral groove 18 formed in the rear portion of the arbor. Work 19 having a relatively large diameter bore is indicated by dot and dash lines in Fig. 1. The work is mounted on the mandrel by inserting the arbor 2 with the bars 7 positioned thereon in retracted position through the bore formed axially therethrough, and then turning the nut 10 to advance the bars in a rearward direction on the arbor until the outer faces 8 on the work bars 7 come in contact with the internal surface of the work. It will therefore be noted that in mounting work having relatively large internal diameter bores the bars are moved radially outwardly by the inclined guide ways 3 until the common rear ends of the bars extend beyond the arbor and are unsupported by the side faces of the guide ways, a condition which permits severe lateral strains to occur in the bars which causes breakage of the unsupported bar ends.

A characteristic of my invention is to provide a circular row of radially extending recesses 20 in the forward face 21 of the bumper sleeve. As most clearly illustrated in Figs. 1 and 3 the recesses are positioned in longitudinal alignment with the work contacting bars and are of a width and radial extent to receive and laterally support the rear end portions 12 of the bars.

The bumper sleeve is held against rotative movement on the arbor by guide means which preferably takes the form of a key 22 slidable in a groove 23 formed longitudinally in the interior face 24 of the sleeve, said key extending from the said groove into a spline 25 formed longitudinally in the periphery of the arbor and which extends from the stop 16 forwardly to a position adjacent the threads 6 in the arbor (Fig. 2). As best shown in Figs. 2 and 4 the key 22 is provided with limited vertical movement in the groove 23 and the spline 25, the radial position of said key being controlled by a set screw 26 threaded in an internal bore 27 formed radially in the sleeve. The inner leading end 28 of the set screw is reduced and extends into a hole 29 formed in the outer face of the key, it being understood that this connection between the screw and the key precludes longitudinal movement of the key relative to the bumper sleeve. When the screw 26 is tightened it bears inwardly upon the key 22 which in turn is forced against the bottom of the spline 24 to securely clamp the sleeve in selected positions along the arbor. Upon release of the set screw the key is made free of the spline bottom and the bumper sleeve may be manually slid longitudinally on the arbor between the stop 16 and the rearward ends of the work bars, the key and spline connection preventing rotative movement of the sleeve on the arbor and insuring that the recesses 21 in the bumper sleeve will always be in axial alignment with the ends 12 of the work bars 7 when the sleeve is employed either as a lateral support for the bar ends or is being used as a longitudinally actuated bumper to release the bars from the work.

What is claimed is:

1. In an expansible mandrel, the combination with an arbor having a plurality of inclined, longitudinal guide ways radially spaced about the periphery thereof and formed with a forward, threaded end, said guide ways being convergent in the direction of said threaded end, work aligning bars slidable in the guide ways, and a bar traversing nut cooperative with the threaded end, of a bumper sleeve slidable longitudinally on the rear end of the arbor from the common rear edges of the bars to a fixed stop on the rear end of the arbor, said sleeve having a circular row of radially extending recesses formed in its forward face, said recesses being disposed in alignment with the bars and of a width and radial extent to snugly receive and laterally support the rear end portions of the bars, spline means for guiding the bumper sleeve on the arbor for longitudinally directed, rectilinear movement between the stop and the threads, and releasable clamp means on said bumper sleeve to secure the sleeve in selected longitudinal positions on the arbor with the work bar ends each positioned within its respective recess in the sleeve.

2. In an expansible mandrel, the combination with an arbor having a plurality of inclined, longitudinal guide ways radially spaced about the periphery thereof and formed with a forward, threaded end, said guide ways being convergent in the direction of said threaded end, work aligning bars slidable in the guide ways, and a bar traversing nut cooperative with the threaded end, of a bumper sleeve slidable longitudinally on the rear end of the arbor from the common rear ends of the bars to a fixed stop on the rear end of the arbor, said sleeve having a circular row of radially extending recesses formed in its forward face, said recesses being disposed in alignment with the bars and of a width and radial extent to receive and support the rear end portions of the bars, a spline formed longitudinally in the periphery of the arbor and extending from the stop forwardly to the threads, a key on the bumper sleeve extending into the spline, and releasable clamp means on said sleeve for securing the bumper in longitudinal selected positions on the arbor with the work bar ends positioned within the circular row of recesses in the forward bumper face.

3. An expansible mandrel according to claim 2 characterized by the fact that the bumper key is positioned in a groove formed in the interior cylindrical face of the sleeve, that a threaded bore is formed radially through the sleeve body from the exterior cylindrical face of the sleeve into the said groove, and that a set screw is threaded in the bore and has a reduced leading end extending into a hole formed in the outer face of the key.

References Cited in the file of this patent

UNITED STATES PATENTS

| | | |
|---|---|---|
| 67,708 | Bechtel et al. | Aug. 13, 1867 |
| 122,920 | Simons | Jan. 23, 1872 |
| 276,760 | Bramwell | May 1, 1883 |
| 289,248 | Gendron | Nov. 27, 1883 |
| 1,152,440 | Scheuber | Sept. 7, 1915 |
| 2,526,772 | Reynolds | Oct. 24, 1950 |
| 2,544,633 | Le Count | Mar. 6, 1951 |

FOREIGN PATENTS

| | | |
|---|---|---|
| 40,670 | Switzerland | Dec. 6, 1907 |